United States Patent
Hosein et al.

(10) Patent No.: US 7,616,660 B2
(45) Date of Patent: *Nov. 10, 2009

(54) COMMON RATE CONTROL METHOD FOR REVERSE LINK CHANNELS IN CDMA NETWORKS

(75) Inventors: Patrick A. Hosein, San Diego, CA (US); Tao Wu, Carlsbad, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 869 days.

This patent is subject to a terminal disclaimer.

(21) Appl. No.: 10/876,979

(22) Filed: Jun. 25, 2004

(65) Prior Publication Data
US 2005/0111407 A1 May 26, 2005

Related U.S. Application Data

(63) Continuation-in-part of application No. 10/755,104, filed on Jan. 9, 2004, and a continuation-in-part of application No. 10/718,939, filed on Nov. 21, 2003, and a continuation-in-part of application No. 10/719,811, filed on Nov. 21, 2003.

(51) Int. Cl.
*H04J 3/22* (2006.01)
(52) U.S. Cl. .................. 370/468; 370/235; 370/252
(58) Field of Classification Search ........... 370/311, 370/468, 477, 310, 329, 335, 342, 229, 230, 370/230.1, 232, 233, 234, 235, 236, 252, 370/253
See application file for complete search history.

(56) References Cited

U.S. PATENT DOCUMENTS

| | | | |
|---|---|---|---|
| 5,528,593 A | 6/1996 | Dejaco et al. | |
| 6,134,220 A | 10/2000 | Delprat et al. | |
| 6,397,070 B1 * | 5/2002 | Black | 455/453 |

(Continued)

FOREIGN PATENT DOCUMENTS

EP 0715431 6/1996

(Continued)

OTHER PUBLICATIONS

Hosein P et al: "On the tradeoff between throughput and fairness on the reverse link of a 3G CDMA network", Globecom '04. IEEE Global Telecommunications Conference (IEEE CAT. No. 04CH37615) IEEE Piscataway, NJ, USA, vol. 6, 2004, pp. 3850-3854 Vol., XP002338914.

(Continued)

*Primary Examiner*—Ricky Ngo
*Assistant Examiner*—Gary Mui
(74) *Attorney, Agent, or Firm*—Coats & Bennett, P.L.L.C.

(57) ABSTRACT

A radio base station transmits periodic load indications based on the measured reverse link load to a plurality of mobile stations transmitting on a reverse link channel. If the measure reverse link load is within a first predetermined range, the radio base stations transmits a load indication instructing mobile stations transmitting on the reverse link to change their transmission rate probabilistically. If the reverse link load is within second predetermined range outside the first predetermined range, the radio base station transmits a load indication instructing mobile stations transmitting on the reverse link to change their transmission rate deterministically.

41 Claims, 7 Drawing Sheets

U.S. PATENT DOCUMENTS

| | | |
|---|---|---|
| 6,477,502 B1 | 11/2002 | DeJaco et al. |
| 6,490,460 B1 * | 12/2002 | Soliman ..................... 455/522 |
| 6,999,425 B2 * | 2/2006 | Cheng et al. ................ 370/252 |
| 7,054,275 B2 * | 5/2006 | Kim et al. ................... 370/252 |
| 7,158,796 B2 * | 1/2007 | Tiedemann et al. ......... 455/453 |
| 2002/0141349 A1 * | 10/2002 | Kim et al. ................... 370/252 |
| 2003/0073443 A1 * | 4/2003 | Bae et al. .................... 455/450 |
| 2003/0078010 A1 | 4/2003 | Davis |
| 2003/0086397 A1 * | 5/2003 | Chen ........................... 370/335 |
| 2004/0179525 A1 * | 9/2004 | Balasubramanian et al. 370/391 |
| 2004/0202136 A1 * | 10/2004 | Attar et al. .................. 370/333 |
| 2004/0252669 A1 | 12/2004 | Hosein |
| 2005/0105604 A1 * | 5/2005 | Ito et al. ...................... 375/225 |

FOREIGN PATENT DOCUMENTS

| | | |
|---|---|---|
| EP | 1231807 | 8/2002 |
| EP | 1 246 384 | 10/2002 |
| WO | WO02/35735 | 5/2002 |
| WO | WO 2004/045239 | 5/2004 |

OTHER PUBLICATIONS

Harri Holma and Antti Toskala: "WCDMA for UMTS," John Wiley & Sons, Ltd. 2000 XP002278973, p. 123-p. 127.

* cited by examiner

COMMON RATE CONTROL METHOD FOR REVERSE LINK CHANNELS IN CDMA NETWORKS

RELATED APPLICATIONS

This application is a continuation-in-part of U.S. patent application Ser. No. 10/755,104 filed on Jan. 9, 2004; U.S. patent application Ser. No. 10/718,939 filed Nov. 21, 2003; and U.S. patent application Ser. No. 10/719,811 filed Nov. 21, 2003. These applications are incorporated in their entirety by reference herein.

BACKGROUND OF THE INVENTION

In code division multiple access (CDMA) networks, the mobile stations share a reverse link channel and may transmit simultaneously on the reverse link channel to a radio base station. Common rate control is one technique used to control the load at the radio base station. With common rate control, all mobile stations that need to transmit data on the reverse link are allowed to do so. Each mobile station initially begins transmitting at a specified minimum rate (sometimes called the autonomous rate) and then, depending on load at the radio base station, is allowed to vary its transmission rate. The radio base station periodically estimates the reverse link load and compares the estimated reverse link load to a target load. If the measured load is below a target threshold, the radio base station commands the mobile stations in its cell or sector to increase their transmission rate. Conversely, if the measured load is above the target threshold, the radio base station commands the mobile stations to decrease their transmission rate. In some systems, the radio base station may command the mobile stations to hold their current transmission rate.

With common rate control, the radio base station broadcasts a single up/down/hold rate control command to all mobile stations in a cell or sector and all of the mobile stations respond to the extent that they are able. That is, when a radio base station commands the mobile stations in a cell or sector to increase their transmission rate, all mobile stations in the cell or sector except those already transmitting at maximum power will increase their transmission rate. When a radio base station commands the mobile stations in a cell or sector to decrease their transmission rate, all mobile stations except those already transmitting at minimum power will decrease their transmission rate. Thus, common rate control results in significant fluctuations in load at the radio base station because many mobile stations are changing their data transmission rates at the same time.

The anticipated fluctuations in load are taken into account when setting the target load. The target load is typically selected to balance system throughput against the probability of outages. An outage is considered to occur when the power required to maintain minimum signal quality standards is greater than the maximum transmit power of the mobile station. As an example, a service provider may set the target load so that the frequency of outages is below a predetermined threshold, e.g., 1%. In general, minimizing fluctuations in load at the radio base station would enable the target load to be set higher while maintaining desired service quality objectives.

SUMMARY OF THE INVENTION

The present invention comprises a method and apparatus for implementing common rate control in a reverse link channel in a CDMA network. A radio base station periodically (e.g., once per frame) estimates the reverse link load and broadcasts a load indication to mobile stations transmitting on a reverse link channel. Depending on the measured load at the radio base station, the load indication may instruct the mobile stations to increase or decrease their data transmission rate either deterministically or probabilistically. In one embodiment of the invention, the base station transmits a load indication that instructs the mobile stations to change their data transmission rate probabilistically if the measured load is within a predetermined range of the target load. Some mobile stations will change their data transmission rate by one step while others will remain at their current data transmission rate. Thus, fluctuations are reduced as compared to a system in which all mobile stations that can do so must change rate. If the measured load is outside the predetermined range, the radio base station transmits a load indication that instructs the mobile stations to change their data transmission rate deterministically. In this case, the measured load at the radio base station is either significantly above or below the target load. In a preferred embodiment of the invention, all of the mobile stations that can do so are required to either increase or decrease their data transmission rate by one step.

The mobile stations dynamically adjust their data transmission rate based on the periodic load indications from the base station. In one embodiment, the mobile stations calculate a load tracking value based on two or more periodic load indications, and then calculate a rate change probability as a function of the load tracking value. When the load indication from the base station indicates that the measured load is within a desired range of the target load, the mobile stations interpret the load indication as a command to change their data transmission rate probabilistically. In this case, the mobile stations selectively change their transmission rate responsive to a current load indication based on the rate change probability. The rate change probability determines the probability that the mobile station will change its data transmission rate in the current evaluation period. Consequently, some number of mobile stations will change rates, and some other number of mobile stations will continue to transmit at their current rate. If the load indication indicates that the measured load is outside the desired range, the mobile stations interpret the load indication as a command to change rate by one step and all mobile stations that can do so change their data transmission rate.

DETAILED DESCRIPTION OF THE INVENTION

Figure 1:
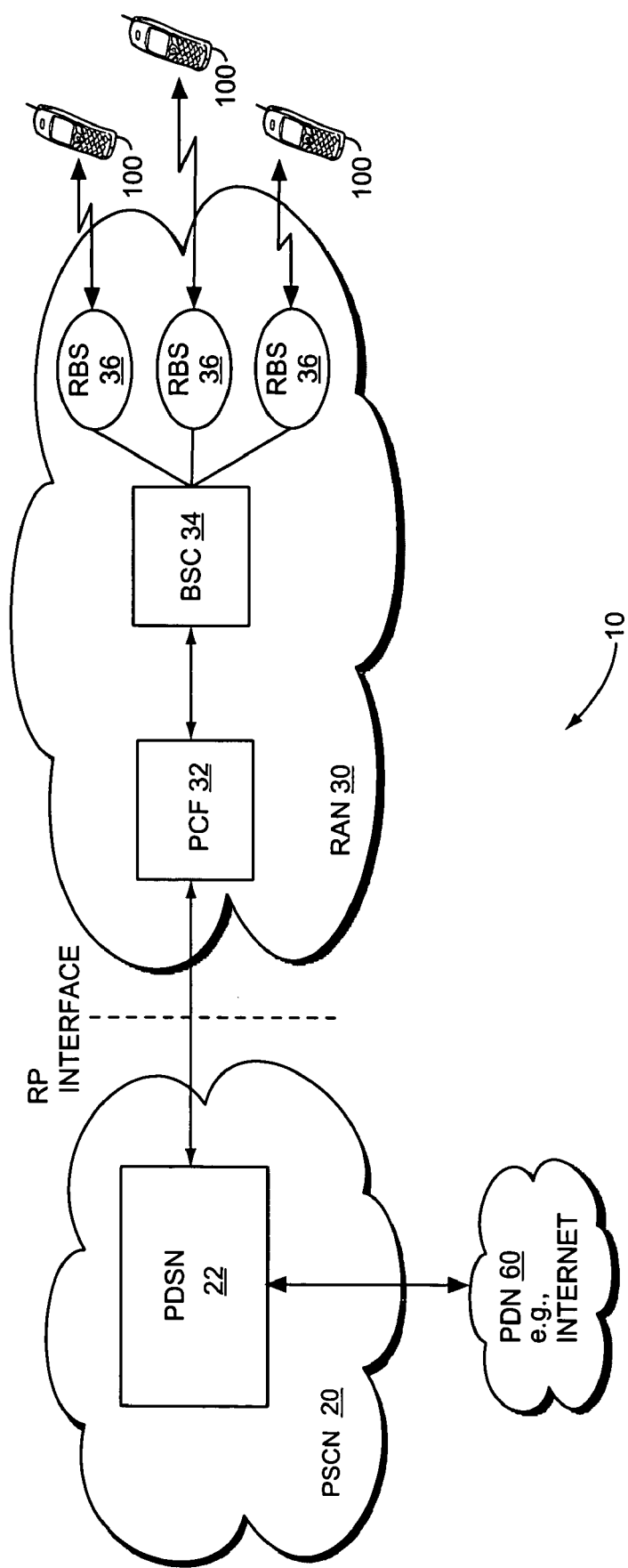
FIG. 1 is a diagram of an exemplary wireless communication network according to one or more embodiments of the present invention.

Turning to the drawings, FIG. 1 illustrates an exemplary wireless communication network 10 in which the present invention may be implemented. Network 10 in the disclosed embodiment is Code Division Multiple Access (CDMA) network operating according to the IS-2000 standard. However, those skilled in the art will appreciate that the present invention is not limited to use in IS-2000 networks, but may be employed in CDMA networks operating according to other standards, such as the Wideband CDMA (WCDMA) standard and UMTS standard.

Network 10 includes a Packet-Switched Core Network (PSCN) 20 and a Radio Access Network (RAN) 30. The PSCN 20 includes a packet data serving node (PDSN) 22 that provides a connection to one or more Public Data Networks (PDNs) 60, such as the Internet. The RAN 30 provides the radio interface between the mobile stations 100 and the PCSN 12. An exemplary RAN 30 comprises a Packet Control Function (PCF) 32, one or more Base Station Controllers (BSC) 34, and a plurality of Radio Base Stations (RBSs) 36 operating as specified in the IS-2000 standard. BSCs 34 connect the RBSs 36 to the PCF 32. Mobile stations 100 communicate with the RBSs 36 via the air interface.

Figure 2:
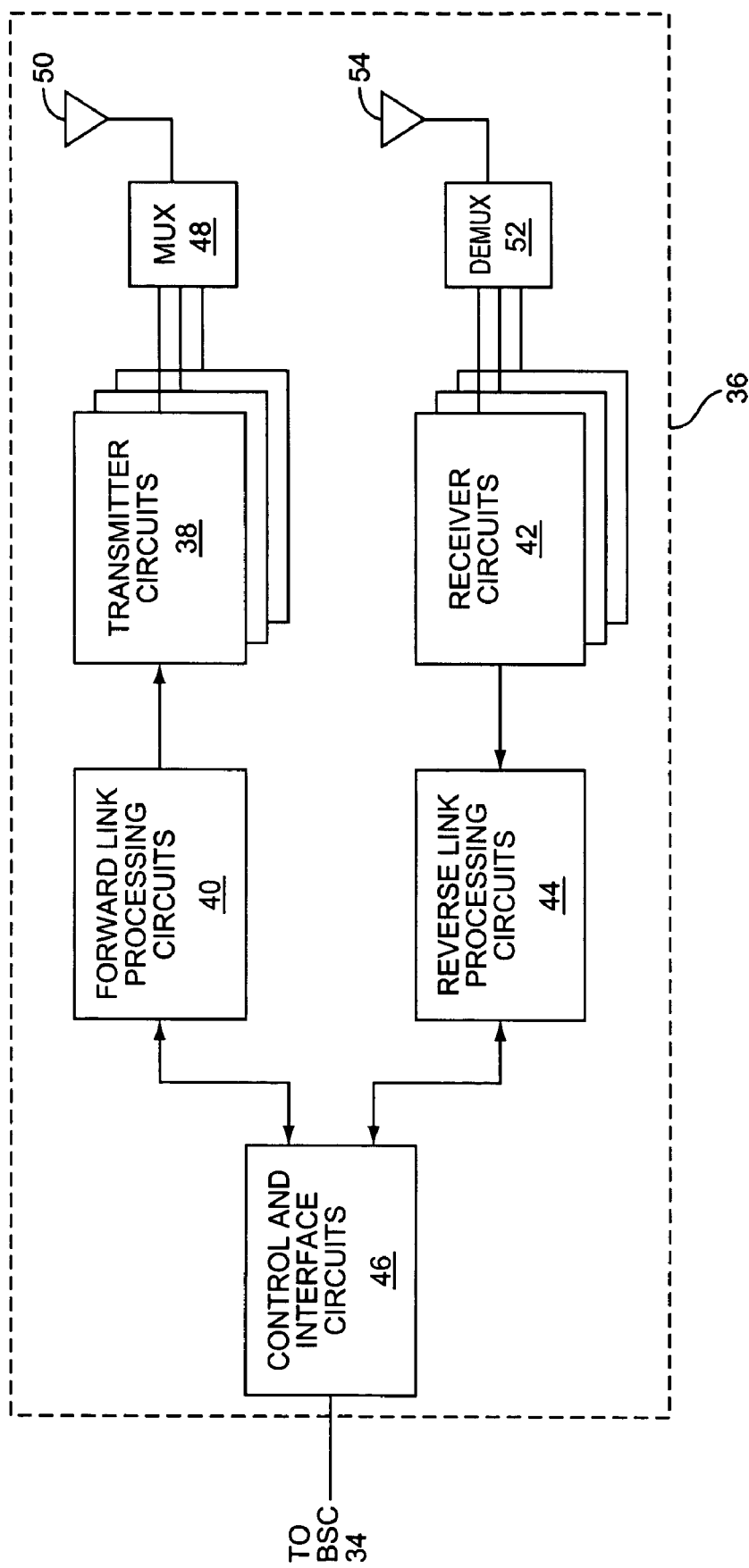
FIG. 2 is a diagram of exemplary functional details for a radio base station according to the present invention.

FIG. 2 illustrates a functional diagram of an exemplary RBS 36 according to one embodiment of the present invention. It will be appreciated that the present invention is not limited to the RBS architecture illustrated in FIG. 2, and that other RBS architectures are applicable to the present invention. The functional elements of FIG. 2 may be implemented in software, hardware, or some combination of both. For example, one or more of the functional elements in RBS 36 may be implemented as stored program instructions executed by one or more microprocessors or other logic circuits included in RBS 36.

As shown in FIG. 2, RBS 36 includes transmitter circuits 38, forward link signal processing circuits 40, receiver circuits 42, reverse link signal processing circuits 44, and control and interface circuits 46. The transmitter circuits 38 couple to one or more transmit antennas 50 via a multiplexer 48 and include the necessary RF circuits, such as modulators and power amplifiers, to transmit signals to mobile stations 100. The forward link signal processing circuits 40 process the signals being transmitted to the mobile stations 100. Forward link signal processing may include digital modulation, encoding, interleaving, encryption, and formatting. The receiver circuits 42 couple to one or more receive antennas 54 via a demultiplexer 52 and comprise the RF components, such as amplifiers, filters, downconverters and A-to-D converters, necessary to receive signals from the mobile stations 100. Reverse link processing circuits 44 process the signals received from the mobile stations 100. Reverse link processing may include, for example, digital demodulation, decoding, de-interleaving, and decryption. Control and interface circuits 46 coordinate the operation of the RBS 36 and the mobile stations 100 according to the applicable communication standards and interface the RBS 36 with the BSC 34. The forward link processing circuits 40, reverse link processing circuits 44, and control and interface circuits 46 may be integrated in a single processor, or may be implemented in multiple processors, hardware circuits, or a combination of processors and hardware circuits.

Figure 3:
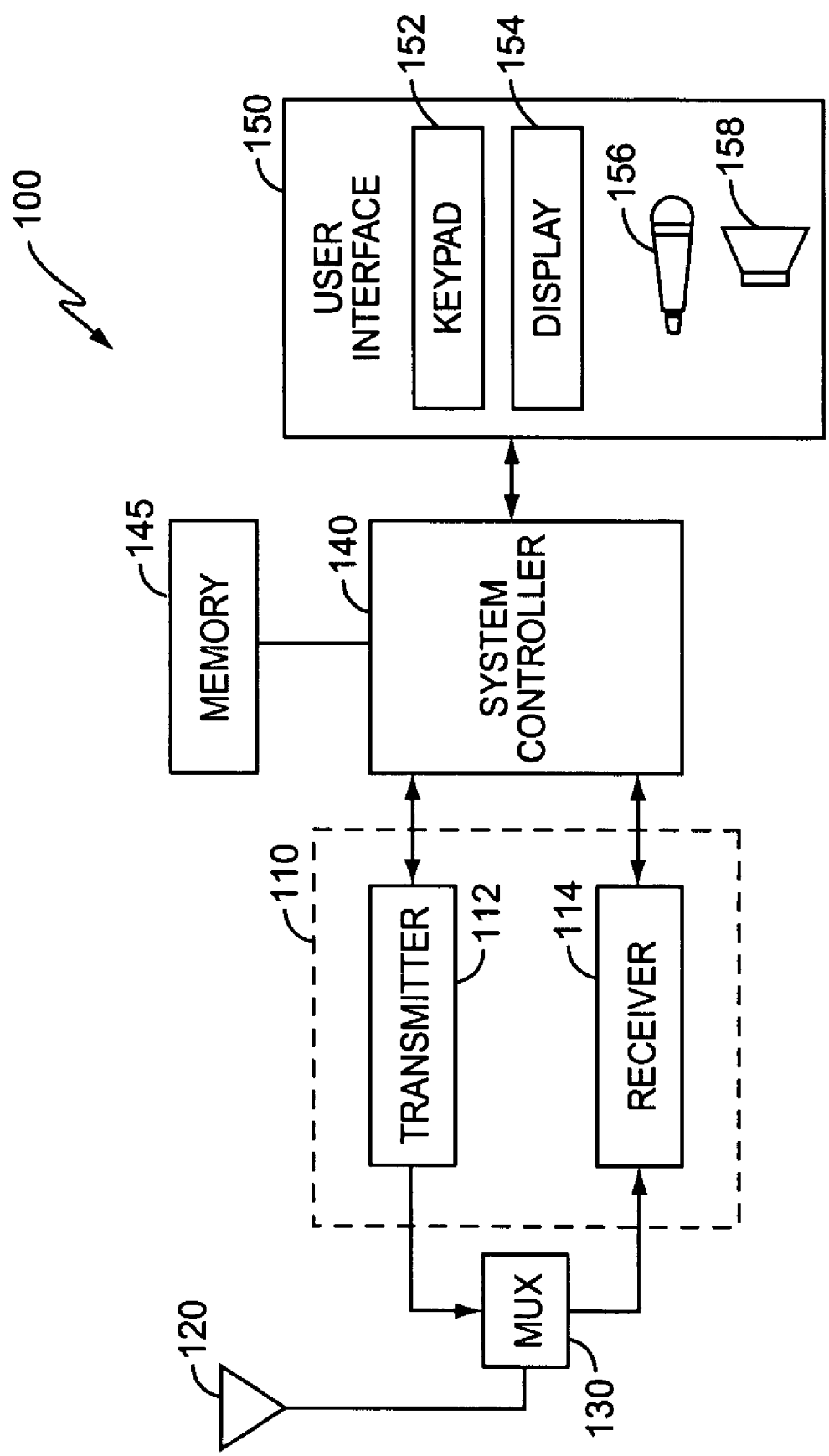
FIG. 3 is a functional block diagram of an exemplary mobile station according to the present invention.

FIG. 3 is a functional block diagram of an exemplary mobile station 100 according to one embodiment of the present invention. As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

Mobile station 100 includes a transceiver 110 connected to an antenna 120 via a multiplexer 130 as known in the art. Mobile station 100 further includes a system controller 140, and a user interface 150. Transceiver 110 includes a transmitter 112 and a receiver 114. Transceiver 110 may, for example, operate according to the IS-2000, WCDMA or UMTS standards. The present invention, however, is not limited to use with these standards and those skilled in the art will recognize the present invention may be extended or modified for other standards.

System controller 140 provides overall operational control for the mobile station 100 according to programs instructions stored in memory 145. System controller 140 may comprise a microprocessor or microcontroller and may be part of an application specific integrated circuit (ASIC). Memory 145 provides storage for data, operating system programs and application programs. Memory 145 may be integrated with the system controller 140, or may be implemented in one or more discrete memory devices. User interface 150 allows the user to interact and control the mobile station 100. User interface 150 typically comprises a keypad 152, display 154, microphone 156 and/or speaker 158. Other input and output devices may also present. Keypad 152 allows the operator to enter commands and select menu options while display 154 allows the operator to see menu options, entered commands, and other service information. Microphone 156 converts the operator's speech into electrical audio signals and speaker 158 converts audio signals into audible signals that can be heard by the operator. It will be understood by those skilled in the art that mobile station 100 may comprise a subset of the illustrated user interface elements or mobile station 100 may comprise additional user interface elements not shown or described herein.

The RBS 36 communicates with a plurality of mobile stations 100. In the exemplary embodiment, the mobile stations 100 transmit data to the RBS 36 over a reverse link channel that is rate controlled. The reverse link channel is preferably, but not necessarily, one designed for packet data. Multiple mobile stations 100 can transmit simultaneously on the reverse link channel and the RBS 36 distinguishes their respective signals by the spreading codes that are assigned to the mobile stations 100 at connection setup. When the RBS 36 despreads the signal received from a given mobile station 100, the transmission from all other mobile stations 100 appear as noise. The quality of a signal received from a given mobile station 100 by the RBS 36 depends on thermal noise and the noise generated by all the other mobile stations 100. The total noise is dependent on the number of mobile stations 100 simultaneously transmitting on the reverse link and the transmission power of those mobile stations 100.

Signal to noise ratio (SNR) is one measure of the quality of the received signal. To maintain minimum signal quality standards, the mobile station 100 must transmit with enough power to maintain the SNR of the received signal above a predetermined level. If the noise floor (thermal noise+noise from other mobile stations 100) gets too high, the required transmit power to maintain the minimum signal quality standards, may exceed the maximum transmit power of the mobile station 100. This condition is referred to as an outage.

The RBS 36 uses common rate control as one technique to control the amount of interference on the reverse link channel.

The general aim of common rate control is to maintain the reverse link load as close as possible to a desired target load so that the number of outages is maintained at an acceptable level, e.g. 1%, while utilizing the reverse link channel to the fullest extent possible. In most common rate control schemes, mobile stations 100 that have data to transmit are allowed to transmit. Initially, a mobile station 100 begins transmitting at a very low rate called the autonomous rate, which may for example be a rate of 9.6 kbps. After a mobile station 100 begins transmitting data, it is allowed to vary its transmission rate depending on reverse link load at the RBS 36. The RBS 36 periodically estimates the reverse link load and transmits a load indication to all of the mobile stations 100 transmitting on the reverse link channel. Each mobile station 100 decides whether to increase or decrease its transmission rate based at least in part on the load indication from the RBS 36. Rate adjustment decisions by the mobile stations 100 will tend to follow the load indications from the RBS 36. If the reverse link load at the RBS 36 increases above the target load, the mobile stations 100 in general will decrease their transmission rate to reduce the reverse link load. Conversely, if the reverse link load at the RBS 36 decreases below the target load, the mobile stations 100 in general will increase their transmission rate to increase the load and more efficiently use the reverse link channel. The rate adjustment decision of an individual mobile station 100, however, may not follow the load indication at a given time instant, since other factors (e.g., user class, QoS information, power limitations, etc.) may be evaluated in making the rate control decision.

Common rate control requires no rate feedback information from the mobile stations 100 to the RBS 36, and the RBS 36 broadcasts load indications to all mobile stations 100 on a common control channel. Consequently, common rate control requires a low signaling overhead and is low in implementation complexity. However, common rate control requires that the target load be adjusted to provide sufficient margin to account for expected fluctuations in reverse link load. It is therefore desirable that fluctuations in load be minimized as much as possible so that the target load can be as close as possible to the maximum load.

Figure 4:
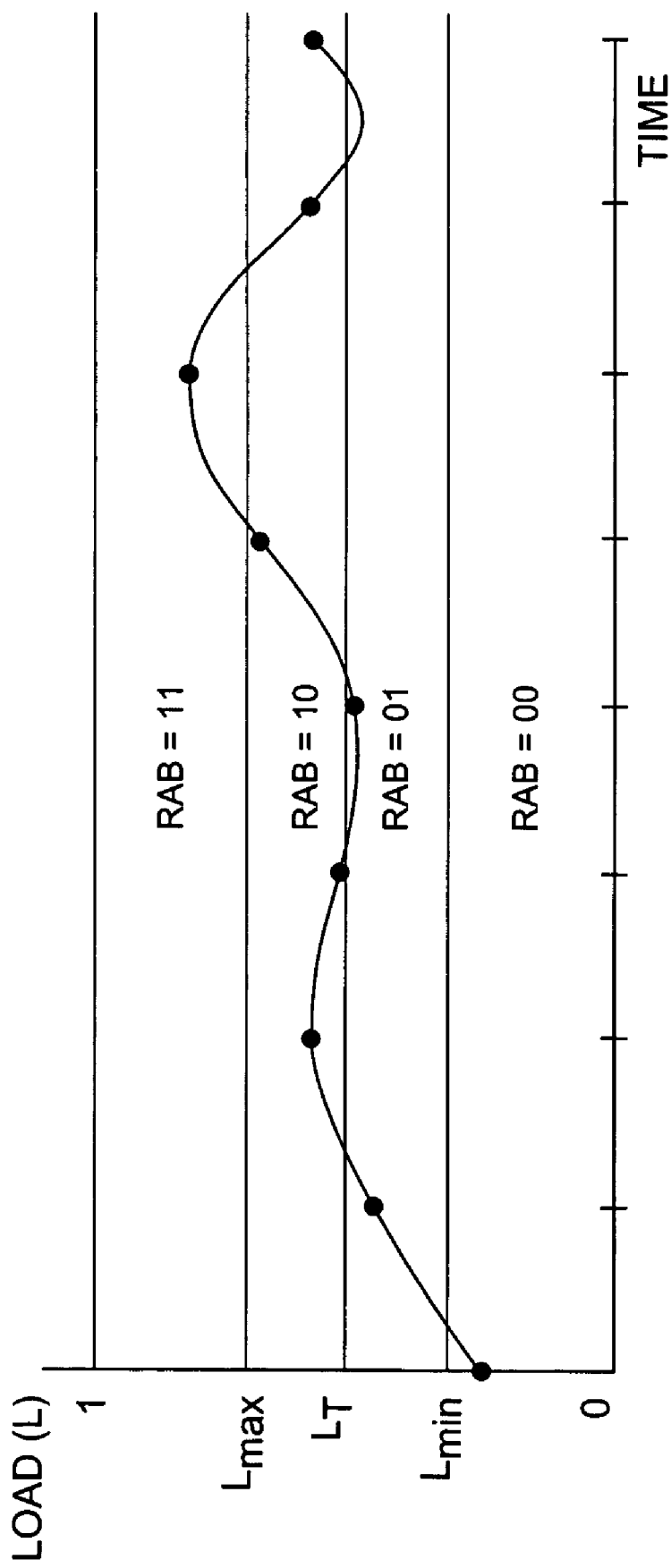
FIG. 4 illustrates an exemplary load curve for a radio base station using common rate control according to a first embodiment of the present invention.

FIG. 4 is a graph illustrating the reverse link load in an exemplary embodiment of the present invention. In FIG. 4. $L_{MAX}$ is the maximum load beyond which the system is unstable and outages are likely to occur. $L_{MIN}$ is the load below which the system is considered lightly loaded. $L_T$ is a target load at which the RBS 36 should operate. The values $L_{MAX}$, $L_T$, and $L_{MIN}$ divide the range of possible load values into four regions, which can be indicated by two bits, referred to herein as the load indication b(n). The load indication b(n) may also be referred to as reverse activity bits (RABs). In one embodiment, the RBS 36 determines the load indication b(n) as follows:

$$\begin{array}{llll} if & (L(n) >= L_{MAX}) & \{set\ b(n) = 11\} & Eq.\ 1 \\ else\ if & (L_{MAX} > L(n) >= L_T) & \{set\ b(n) = 10\} & \\ else\ if & (L_T > L(n) >= L_{MIN}) & \{set\ b(n) = 01\} & \\ else & (L_{MIN} > L(n)) & \{set\ b(b) = 00\} & \end{array}$$

FIG. 4 illustrates graphically the mapping of load levels to corresponding load indications b(n). The load estimation process at the RBS 36 converts continuous load values into a quantized load indication b(n) and transmits the quantized load indication b(n) to the mobile stations 100.

The mobile stations 100 receive the load indications b(n) from the RBS 36 and decide whether to change their data transmission rate in the next evaluation period, e.g. frame. In the exemplary embodiment, $L_{MAX}$ and $L_{MIN}$ define a range of load values centered on the target load value. If the load indication b(n) indicates that the load is between $L_{MAX}$ and $L_{MIN}$, the mobile stations 100 change their transmission rate probabilistically. The manner in which the mobile stations 100 implement the probabilistic rate change is described below. The net effect is that some mobile stations 100 will change their data transmission rate by a predetermined amount, e.g. one rate level, and others will maintain their current rate. If the load indication b(n) indicates that the load at the RBS 36 is outside of the range between $L_{MAX}$ and $L_{MIN}$, the mobile stations 100 change their transmission rate deterministically. In one exemplary embodiment, all mobile stations 100 that can do so either increase or decrease their data transmission rate by a predetermined amount, e.g. one rate level.

Figure 5:
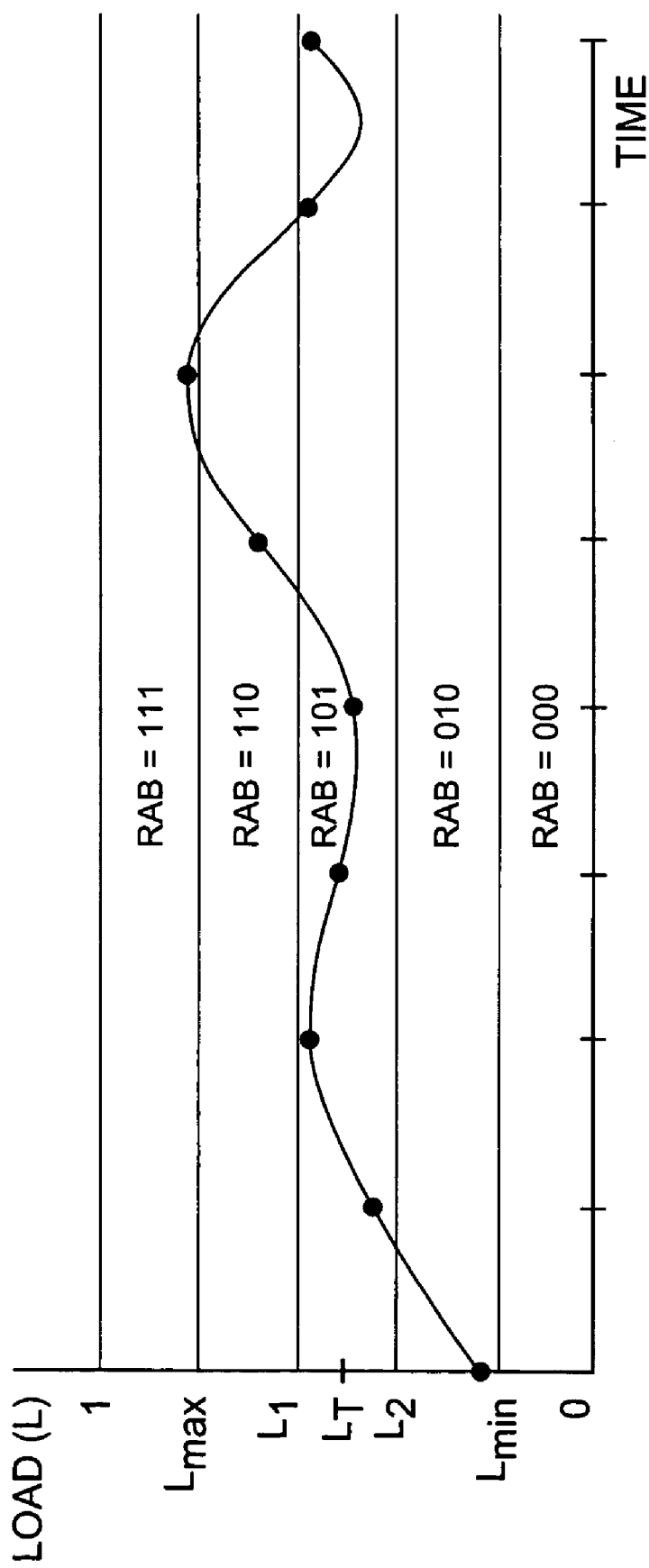
FIG. 5 illustrates an exemplary load curve for a radio base station using common rate control according to a second embodiment of the present invention.
Figure 6:
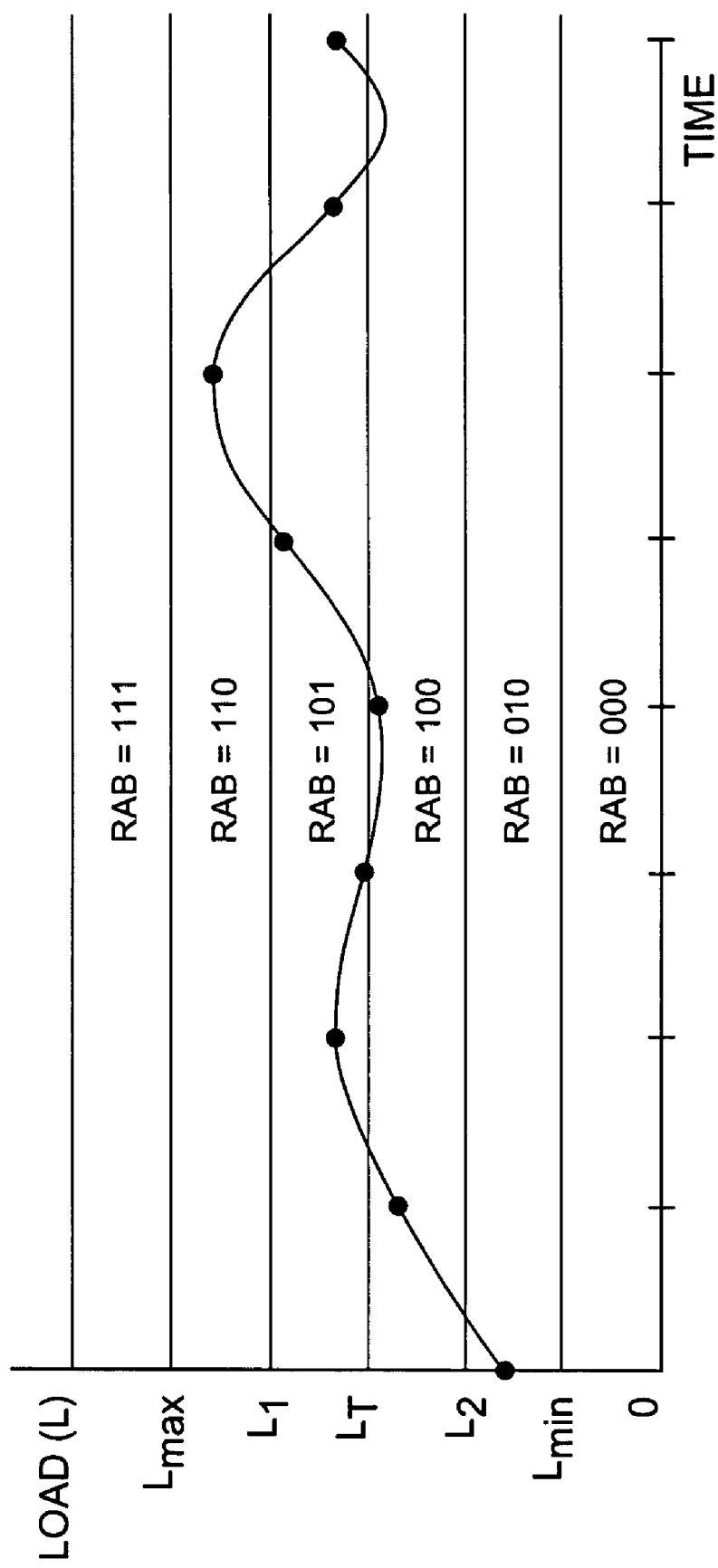
FIG. 6 illustrates an exemplary load curve for a radio base station using common rate control according to a third embodiment of the present invention.

While the exemplary embodiment of the invention described contemplates four different load levels, the present invention is not so limited. The present invention may use any number of load levels. FIGS. 5 and 6 illustrate embodiments of the invention using five and six load levels respectively, which may be indicated using three RABs. Alternatively, up to nine levels may be indicated with two signed RABs.

For the embodiment shown in FIG. 5, the RBS 36 determines the load indication b(n) as follows:

$$\begin{array}{llll} if & (L(n) > L_{MAX}) & \{set\ b(n) = 111\} & Eq.\ 2 \\ elseif & (L_{MAX} >= L(n) > L_1) & \{set\ b(n) = 110\} & \\ elseif & (L_1 >= L(n) > L_2) & \{set\ b(n) = 101\} & \\ elseif & (L_2 >= L(n) > L_{MIN}) & \{set\ b(n) = 010\} & \\ else & & \{set\ b(n) = 000\} & \end{array}$$

If the load indication b(n) indicates that the load at the RBS 36 is between $L_1$ and $L_2$, the mobile stations 100 interpret the load indication b(n) as a command to maintain their current transmission rate. If the load indication b(n) indicates that the load at the RBS 36 is between $L_1$ and $L_{MAX}$, or between $L_2$ and $L_{MIN}$, the mobile stations 100 interpret the load indication b(n) as a command to change their data transmission rate probabilistically. If the load indication b(n) indicates that the load at the RBS 36 is above $L_{MAX}$, or below $L_{MIN}$, the mobile stations 100 interpret the load indication b(n) as a command to change their data transmission rate by a predetermined amount, e.g., one rate level.

For the embodiment shown in FIG. 6, the RBS 36 determines the load indication b(n) as follows:

$$\begin{array}{llll} if & (L(n) > L_{MAX}) & \{set\ b(n) = 111\} & Eq.\ 3 \\ elseif & (L_{MAX} >= L(n) > L_1) & \{set\ b(n) = 110\} & \\ elseif & (L_1 >= L(n) > L_T) & \{set\ b(n) = 101\} & \\ elseif & (L_T >= L(n) > L_2) & \{set\ b(n) = 100\} & \\ elseif & (L_2 >= L(n) > L_{MIN}) & \{set\ b(n) = 010\} & \\ else & & \{set\ b(n) = 000\} & \end{array}$$

If the load indication b(n) indicates that the load at the RBS 36 is between $L_1$ and $L_2$, the mobile stations 100 interpret the load indication b(n) as a command to change their data transmission rate probabilistically. If the load indication b(n) indicates that the load at the RBS 36 is above $L_1$, or below $L_2$, the mobile stations 100 interpret the load indication b(n) as a command to change their data transmission rate deterministically. If the load indication b(n) is between $L_1$ and $L_{MAX}$, or between $L_2$ and $L_{MIN}$, the mobile stations 100 change their transmission rate by a first predetermined amount, e.g. one rate level. If the load indication b(n) indicates that the load at the RBS 36 is above $L_{MAX}$, or below $L_{MIN}$, the mobile stations 100 change their transmission rate by a second predetermined amount, e.g. two rate levels.

To implement probabilistic transmission rate changes by the mobile stations 100, each mobile station 100 computes a load tracking value upon receipt of the load indication b(n) from the RBS 36 that serves as a mobile station estimate of the reverse link load. The algorithm used to compute the load tracking value, referred to herein as the load tracking function, is preferably one that filters or smoothes the load indications b(n) received from the RBS 36 over a plurality of evaluation periods and converts the quantized load indications b(n) into a continuous load tracking value. In this context, the phrase "continuous load tracking value" means that the value of the load tracking function may assume any value within a defined range of values. Thus, the load estimation process at the RBS 36 converts continuous load values into quantized load indications and the load tracking function at the mobile station 100 converts the quantized load indications back into a continuous load tracking value.

In the embodiment shown in FIG. 4, the mobile stations 100 assign a numeric value to each load indication b(n) as follows:

$$b(n) = 11 = 2$$
$$b(n) = 10 = 1$$
$$b(n) = 01 = -1$$
$$b(n) = 00 = -2$$

Eq. 4

The numeric value of the load indication is then used to compute the load tracking value. The load tracking function may be any function that provides a smoothed estimate of reverse link load from the periodic load indications b(n). If y(n) is the load tracking value, then the load tracking value y(n) may be computed according to:

$$y(n) = \alpha b(n) + (1-\alpha) y(n-1),$$

Eq. 5 where the term y(n−1) represents the load tracking value computed at time n−1 and the constant $\alpha$ is a smoothing factor. Eq. 5, in effect, computes a weighted average of the load indications from the RBS 36 over a plurality of evaluation periods, which may for example coincide with frames. The value of $\alpha$, which is in the range of 0 to 1, determines the weight given to the load indication b(n) for the current evaluation period. When set to a value between 0 and 1, the smoothing factor $\alpha$ causes the weight of a periodic load indication for a current evaluation period to exponentially diminish in subsequent evaluation periods. When the smoothing factor $\alpha=1$, the term $(1-\alpha)y(n-1)$ is 0 so that the load tracking value y(n) will always equal the load indication b(n) for the current evaluation period. When the smoothing factor $\alpha$ equals 0, the load tracking value y(n) does not change from one evaluation period to the next.

Other load tracking functions could also be used. For example, the load tracking function could simply be a rolling average of the load indication over a predetermined number of frames. The load indications b(n) could be weighted depending on any desired factors, such as recency to the current evaluation period. Weighting the load indications based on recency would give greater weight to the load indications closer in time to the current evaluation period.

After updating the load tracking value y(n), the mobile stations 100 determine whether to change rate in the next evaluation period or frame. As noted above, if the load indication is outside of a predetermined range, the mobile station 100 may change rate deterministically without regard to the load tracking value. If the load indication b(n) is within a predetermined range, the rate change is made probabilistically by mapping the load tracking value y(n) to a rate change probability P(n), and then changing transmission rate with rate change probability P(n). One way to implement the probabilistic rate change is to make the rate change determination dependent on a random event. For example, the mobile stations 100 may each generate a random number between 0 and 1, and compare the random number with the rate change probability P(n). If all the mobile stations 100 receive the load indications b(n) without error, then all the mobile stations 100 should compute the same or nearly the same rate change probability P(n). The only exception would be where a mobile station 100 has been transmitting for only a few frames. If the rate change probability is, for instance 0.67, mobile stations 100 generating a random number between 0 and 0.67 would change data transmission rates. Those mobile stations 100 generating random numbers between 0.67 and 1 would continue transmitting at their current data transmission rates. Thus, some number of mobile stations 100 will change data transmission rates, and some other number of mobile stations 100 will not, reducing fluctuations in the reverse link load.

In preferred embodiments of the invention, the probability P(n) of changing rate is dependent upon the distance of the load tracking value y(n) from a target load tracking value. Since the load tracking value of Eq. 5 varies between −2 and 2, the target load tracking value may be set equal to 0 and the mapping of the load tracking value to a rate change probability may be according to:

$$P(n) = \frac{|y(n)|}{2}$$

Eq. 6

As shown in Eq. 6, the load tracking value y(n) is scaled to yield a rate change probability in the range of 0 to 1. The probability that a mobile station 100 will change rate will therefore depend on how far the load tracking value y(n) is above or below 0. The scaling of the load tracking value y(n) produces a linear mapping of y(n) to P(n).

The operation of the mobile station 100 in the embodiment of FIG. 4 is as follows:
    if b(n)=2, then reduce present rate by one step
    elself b(n)=−2, then increase present rate by one step
    elseif y(n)>0, then reduce present rate with probability P(n)
    elseif y(n)<0, then increase present rate with probability −P(n)

There may be some conditions under which the mobile station 100 does not change rate. For example, if a mobile station 100 transmitting at the minimum rate, it cannot reduce its rate. Similarly, a mobile station transmitting at the highest rate cannot increase rate. Also, in the mobile station 100 must have sufficient power headroom to increase its rate even if it is not currently at the maximum rate. If hybrid automatic repeat request (HARQ) is used, the mobile station 100 may be required to retransmit a frame at a specified rate, which may be the same rate as the original transmission or at a higher rate.

In the preferred embodiments of the invention, the computation of the load tracking value y(n) by the mobile stations 100 is performed in every evaluation period, even though the load indication b(n) requires the mobile stations 100 to change rate deterministically. In other embodiments, the computation of the load tracking value y(n) may not be computed when the load indication b(n) requires the mobile stations 100 to change rate deterministically. Computation the load tracking value in every evaluation period, however, provides a more accurate estimate at the mobile station 100 of the reverse link load.

An alternative mapping function for computing the rate change probability is:

$$P(n) = \min\{1, |y(n)|\} \quad \text{Eq. 7}$$

When the load tracking value y(n) is greater than 0, the rate change probability P(n) is the greater of y(n) and 1. When y(n) is less than to 0, the rate change probability P(n) is the greater of 1 and −y(n). In this example, when y(n) is greater than or equal to 1 or less than or equal to −1, the rate change probability P(n)=1. When Y(n) is less than 1 and greater than −1, the rate change probability P(n) varies linearly with the distance of the load tracking value from 0. Thus, the mapping function of Eq. 7 produces a bounded linear mapping of y(n) to P(n).

Those skilled in the art will appreciate that mapping from y(n) to a rate change probability P(n) can be a general mapping and need not be restricted to the linear mappings. Eqs. 8 and 9 below are mapping functions that illustrate one approach to calculating rate change probabilities based on an expected load value. In this example and all examples to follow, it is assumed that the load tracking value y(n) varies between −1 and 1, or is scaled to yield a value between −1 and 1. When y(n)>0, the load tracking value y(n) can be mapped non-linearly to a downward rate change probability $P_d(n)$ according to:

$$P_d(n) = \frac{2y(n)(\beta-1)}{1+y(n)(\beta-1)} \quad \text{Eq. 8}$$

When y(n)<0, the load tracking value can be mapped non-linearly to an upward rate change probability $P_u(n)$ according to:

$$P_u(n) = \frac{-y(n)(\beta-1)}{1+y(n)(\beta-1)} \quad \text{Eq. 9}$$

In Eqs. 8 and 9, β is a load ratio that specifies the ratio of a desired target load to the maximum load. Eqs. 8 and 9 map the load tracking value y(n) non-linearly to a corresponding rate change probability P(n) such that the expected load following the rate change will be at a desired target load.

In some embodiments of the invention, the mapping of the load tracking value to a rate change probability can be made mobile dependent, QoS dependent, or user class dependent. As an example of user class dependent rate change probabilities, assume that the mobile stations 100 are classified into three classes: gold, silver and bronze. Also assume that the load tracking value varies between −1 and 1, or is scaled to yield a value between −1 and 1. If $\gamma_i$ represents a class dependent adjustment factor, a mobile station 100 in class i computes the rate change probability as follows:

$$\text{if} \quad y(n) > \gamma_i \quad \{\text{set } P(n) = \min(1, (y(n) - \gamma_i)/(1 - \gamma_i))\} \quad \text{Eq. 10}$$
$$\text{if} \quad y(n) < \gamma_i \quad \{\text{set } P(n) = \min(1, (\gamma_i - y(n))/(\gamma_i + 1))\}$$
$$\text{else if} \quad \{\text{set } P(n) = 0\}$$

Note that values of $\gamma_i$ are selected such that $$\sum_i \gamma_i = 0$$

for all classes. If $\gamma_i$=0.5 for gold users, $\gamma_i$=0 for silver users, and $\gamma_i$=−0.5 for bronze users, users in the higher classes will be favored and will get a larger fraction of the available load. Eq. 10.

Figure 7:
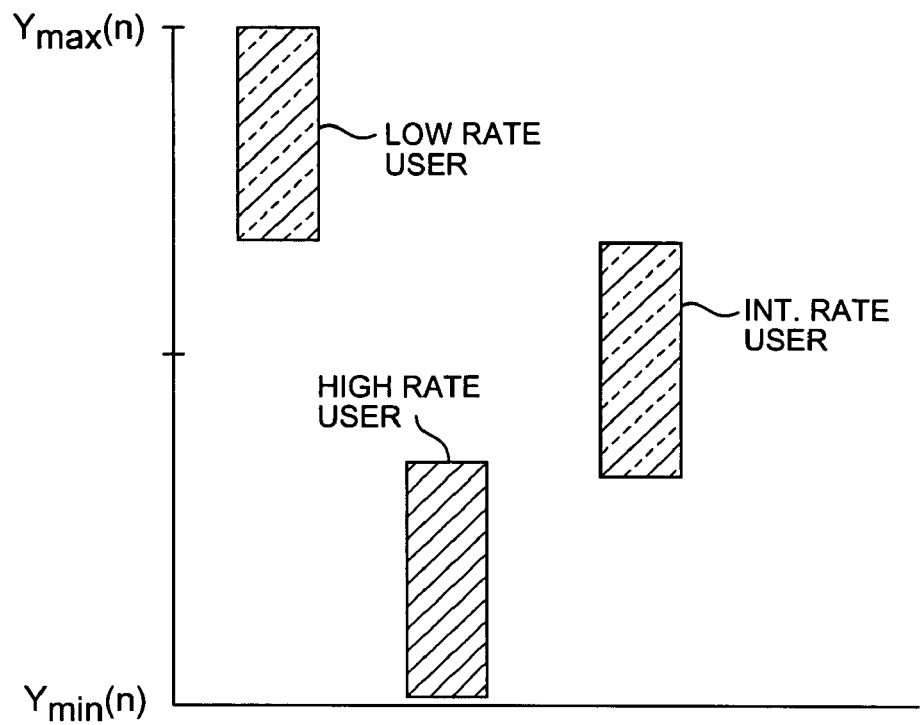
FIG. 7 illustrates a rate dependent sliding window for common rate control according to the present invention.

The calculation of the rate change probabilities of the mobile station 100 may, in some embodiments, be made mobile dependent. Referring to FIG. 7, a sliding window or mask over the load tracking range is defined for each mobile station 100. The size $S_k$ of the sliding window may be the same for all mobile stations 100, or may be different for different classes of users. The size $S_k$ of the sliding window may be fixed for each user or may be dynamically adjusted. The size of the sliding window will be some value less than $Y_{MAX} - Y_{MIN}$. As shown in FIG. 7, the position of the sliding window for a given mobile station 100 is dependent on the current transmission rate of the mobile station 100. For very low rate users, the sliding window will be near the top of the load tracking range. For high rate users, the sliding window will be near the bottom of the load tracking range. For mobile stations 100 operating at transmission rates somewhere in the middle, the sliding window will be somewhere in the middle of the load tracking range. If $R_{MAX}$ is the maximum transmission rate, is $R_{MIN}$ the minimum transmission rate, and $R_K$ is the current transmission rate, the position of the sliding window may be computed according to:

$$T_{MAX} = S_k(R_{MAX} - R_K)/(R_{MAX} - R_{MIN}) * Y$$
$$T_{MIN} = S_k(R_{MIN} - R_K)/(R_{MAX} - R_{MIN}) * Y \quad \text{Eq. 11}$$

where $|Y_{MAX}| = |Y_{MIN}| = Y$. $T_{MAX}$ specifies the top of the sliding window, while $T_{MIN}$ specifies the bottom of the sliding window.

After computing the load tracking value y(n) for the current evaluation period, the mobile station 100 compares the current load tracking value y(n) to the sliding window. If the current load tracking value y(n) is within the sliding window, the mobile station 100 sets the rate change probability P(n) to 0. If the load tracking value y(n) is outside of the sliding window, the mobile station 100 computes the rate change probability P(n) as previously described. Those skilled in the art will appreciate that, instead of setting the rate change probability to 0 when the load tracking value y(n) is within the sliding window, either the load tracking value y(n) or the rate change probability P(n) could be multiplied by an adjustment factor to reduce the probability of a rate change.

Applying a rate dependent sliding window or mask as described above will tend to cause the mobile stations 100 to converge to the same transmission rate. High rate mobile stations 100 will ignore commands to increase transmission rates while responding to commands to decrease transmission rates. Conversely, low rate mobile stations 100 will respond to commands to increase transmission rate, while ignoring commands to decrease transmission rate. As a consequence, the transmission rates for all mobile stations 100 will tend to converge to a common value.

Having all mobile stations 100 transmit at the same rate will tend to reduce system throughput because mobile stations 100 operating under favorable conditions will have their data transmission rate constrained by other mobile stations 100 operating under less favorable conditions. To improve throughput, mobile stations 100 operating under advantageous conditions should be allowed to transmit at higher rates than mobile stations 100 under less favorable conditions.

Figure 8:
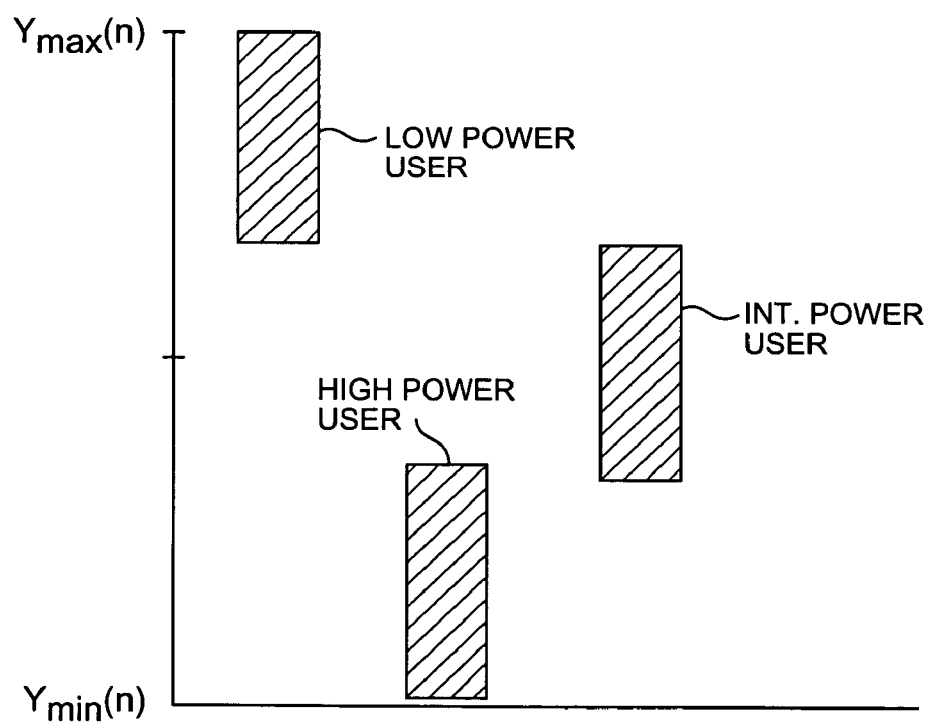
FIG. 8 illustrates a power dependent sliding window for common rate control according to the present invention.

FIG. 8 illustrates a method of determining rate change probabilities that are power dependent. Again, the concept of a sliding window or mask is used. The position of the sliding window is determined based on the mobile station's current transmit power $P_K$ instead of the mobile station's current rate level $R_K$. If a given mobile station 100 is transmitting with low power, the sliding window will be near the top of the load tracking range. Conversely, if the mobile station 100 is currently transmitting with high power, the sliding window will be near the bottom of the low tracking range. For a mobile station 100 transmitting at a power level somewhere in the middle, the sliding window will be somewhere in the middle of the low tracking range. The position of the sliding window may be calculated according to:

$$T_{MAX}=S_k(P_{MAX}-P_K)/(P_{MAX}-P_{MIN})*Y$$

$$T_{MIN}=S_k(P_{PMIN}-P_K)/(P_{MAX}-P_{MIN})*Y' \qquad \text{Eq. 12}$$

where If $P_{MAX}$ is the maximum transmit power, $P_{MIN}$ is the minimum transmit power, and $P_K$ is the current transmission power of the mobile station 100.

When the mobile stations 100 receive the load indication b(n) from the RBS 36, the mobile stations 100 compute the load tracking value y(n) and compare the load tracking value y(n) to the sliding window. If the load tracking value y(n) is within the sliding window, the mobile stations 100 may set the rate change probability P(n) to 0. If the load tracking value y(n) is outside of the sliding window, the mobile stations 100 may compute the rate change probability P(n) as previously described. Mobile stations 100 operating at a low transmit power will tend to ignore commands to reduce transmission rate, while mobile stations 100 with high transmit power will tend to ignore commands to increase transmission rate. Consequently, the transmit power for all mobile stations 100 will tend to converge to a common transmit power level.

When all mobile stations transmit at the same power level, the transmission rates will be dependent on the conditions of the reverse link channel. Those mobile stations 100 operating under better conditions will transmit at a higher rate than mobile stations 100 operating under adverse conditions. This rate control method results in "proportionally fair" rates to the mobile stations 100.

In the case of a mobile station 100 in soft handoff, the mobile station 100 may combine the load indications b(n) from the RBSs 36 in its active set. Soft combining of the load indications b(n) to compute the load tracking value may be performed according to:

$$y_i(n)=\beta \text{primary}(y_i(n))+(1-\beta)\text{mean}(y_i(n)) \qquad \text{Eq. 13}$$

where $y_i(n)$ is the load tracking value generated on the ith soft link at frame (n). In Eq. 13, the mobile station computes a weighted average of the load tracking value from the primary RBS 36 and the mean load tracking value from all RBSs 36 in its active set. Alternatively, the mobile station 100 could set the load tracking value equal to the greater of the load tracking value from the primary RBS 36 and the mean load tracking value from all RBSs 36.

What is claimed is:

1. A method of dynamically adjusting the transmission rate of a mobile station, comprising:
   receiving periodic load indications from a radio base station indicative of the reverse link load at the radio base station;
   changing transmission rate probabilistically if the load indication indicates that the reverse link load is within a first predetermined range;
   changing transmission rate deterministically if the load indication indicates that the reverse link load is in a second predetermined range outside said first predetermined range.

2. The method of claim 1 wherein changing transmission rate probabilistically if the load indication indicates that the reverse link load is within a first predetermined range comprises:
   calculating a load tracking value based on two or more periodic load indications;
   determining a rate change probability as a function of the load tracking value; and
   selectively changing the transmission rate of the mobile station with a probability determined by said rate change probability.

3. The method of claim 2 wherein calculating a load tracking value based on two or more periodic load indications comprises evaluating a continuous load tracking function that converts discrete periodic load indications from the radio base station to a continuous load tracking value.

4. The method of claim 2 wherein determining a rate change probability as a function of the load tracking value comprises calculating the rate change probability based on the distance of the load tracking value from a target load tracking value.

5. The method of claim 4 wherein the rate change probability increases with distance over at least a defined range of load tracking values.

6. The method of claim 2 further comprising:
   determining a sliding window in the range of possible load tracking values;
   comparing the load tracking value to the sliding window to obtain a comparison result; and
   determining the rate change probability based on an outcome of the comparison result.

7. The method of claim 6 wherein determining the rate change probability based on an outcome of the comparison result comprises setting the rate change probability dependent on whether the load tracking value is within the sliding window.

8. The method of claim 7 wherein selling the rate change probability dependent on whether the load tracking value is within the sliding window comprises setting the rate change probability to zero when the load tracking value is within the sliding window.

9. The method of claim 6 wherein determining a sliding window in the range of possible load tracking values comprises determining the position of the sliding window in the load tracking range dependent on the current transmission rate of the mobile station.

10. The method of claim 6 wherein determining a sliding window in the range of possible load tracking values comprises determining the position of the sliding window in the load tracking range dependent on the current transmission power of the mobile station.

11. The method of claim 2 wherein determining a rate change probability is dependent on a user class associated with a user of the mobile station.

12. The method of claim 2 wherein determining a rate change probability is dependent on a quality of service criteria.

13. The method of claim 2 wherein selectively changing the transmission rate of the mobile station with a probability determined by said rate change probability comprises comparing the rate change probability to a random probability value, and adjusting the data transmission rate of the mobile station based on the outcome of the comparison.

14. The method of claim 1 wherein changing transmission rate deterministically if the load indication indicates that the reverse link load is in a second predetermined range comprises changing transmission rate by a predetermined amount depending on the load indication.

15. The method of claim 14 wherein changing transmission rate by a predetermined amount depending on the load indication comprises changing the transmission rate by a first predetermined amount if the load indication has a first value and changing the transmission rate by a second predetermined amount if the load indication has a second value.

16. The method of claim 14 wherein the mobile station transmits at a selected one of a set of predetermined rates, and wherein changing transmission rate by a predetermined amount depending on the load indication comprises changing from a currently selected rate to a newly selected rate.

17. The method of claim 16 wherein changing from a currently selected rate to a newly selected rate comprises changing to the next higher or next lower rate in said set of predetermined rates.

18. The method of claim 1 further comprising maintaining the current transmission rate if the load indication indicates that the reverse link load is in a third predetermined range.

19. A mobile station comprising:
a receiver for receiving periodic load indications from a radio base station;
a transmitter for transmitting signals to the radio base station at a variable data transmission rate dependent on the load indications;
a controller to vary the data transmission rate of the mobile station, said controller operative to:
change transmission rate probabilistically if the load indication indicates that the reverse link load is within a first predetermined range;
change transmission rate deterministically if the load indication indicates that the reverse link load is outside said first predetermined range.

20. The mobile station of claim 19 wherein the controller changes the transmission rate probabilistically by:
calculating a load tracking value based on two or more periodic load indications;
determining a rate change probability as a function of the load tracking value; and
selectively changing the data transmission rate of the mobile station responsive to a current rate control command based on the rate change probability.

21. The mobile station of claim 20 wherein the controller calculates the load tracking value by evaluating a continuous load tracking function that converts discrete periodic load indications from the radio base station to a continuous load tracking value.

22. The mobile station of claim 21 wherein the controller determines a rate change probability based on the distance of the load tracking value from a target load tracking value.

23. The mobile station of claim 22 wherein the rate change probability increases with distance over at least a defined range of load tracking values.

24. The mobile station of claim 20 wherein the controller selectively changes the transmission rate of the mobile station by comparing the rate change probability to a random probability value, and adjusting the data transmission rate of the mobile station based on the outcome of the comparison.

25. The mobile station of claim 20 wherein the controller is further operative to:
determine a sliding window in the range of possible load tracking values;
compare the load tracking value to the sliding window to obtain a comparison result; and
determine the rate change probability based on an outcome of the comparison result.

26. The mobile station of claim 25 wherein the controller sets the rate change probability dependent on whether the load tracking value is within the sliding window.

27. The mobile station of claim 25 wherein the controller determines a sliding window in the range of possible load tracking values dependent on the current transmission rate of the mobile station.

28. The mobile station of claim 25 wherein the controller determines a sliding window in the range of possible load tracking values dependent on the current transmission power of the mobile station.

29. The mobile station of claim 20 wherein the controller determines a rate change probability dependent on a user class associated with a user of the mobile station.

30. The mobile station of claim 20 wherein the controller determines a rate change probability dependent on a quality of service criteria.

31. The mobile station of claim 19 wherein changing rate deterministically if the load indication indicates that the reverse link load is in a second predetermined range comprises changing transmission rate by a predetermined amount depending on the load indication.

32. The mobile station of claim 31 wherein changing transmission rate by a predetermined amount depending on the load indication comprises changing the transmission rate by a first predetermined amount if the load indication has a first value and changing the transmission rate by a second predetermined amount if the load indication has a second value.

33. The mobile station of claim 31 wherein the mobile station transmits at a selected one of a set of predetermined rates, and wherein changing transmission rate by a predetermined amount depending on the load indication comprises changing from a currently selected rate to a newly selected rate.

34. The mobile station of claim 33 wherein changing from a currently selected rate to a newly selected rate comprises changing to the next higher or next lower rate in said set of predetermined rates.

35. The mobile station of claim 19 wherein the controller is further operative to maintain the current transmission rate if the load indication indicates that the reverse link load is in a third predetermined range.

36. A method of rate control implemented by a radio base station, comprising:
periodically estimating the reverse link load;
generating a load indication instructing mobile stations transmitting on the reverse link to change their transmission rate probabilistically if the reverse link load is within a first predetermined range;
generating a load indication instructing mobile stations transmitting on the reverse link to change their transmission rate deterministically if the reverse link load is in a second predetermined range outside said first predetermined range.

37. The method of claim 36 wherein said load indication is a multi-bit load indication.

38. The method of claim 36 further comprising generating a load indication instructing mobile stations transmitting on the reverse link to maintain their current transmission rate if the reverse link load is within a third predetermined range.

39. A radio base station comprising:
receive circuits to receive signals on a reverse link channel from a plurality of mobile stations;
transmit circuits to transmit periodic load indications indicative of a reverse link load on the reverse link channel to said mobile stations;
control circuits connected to said receive circuits and said transmit circuits and operative to:
estimate the reverse link load based on signals received by said receiver from said mobile stations transmitting on the reverse link channel;
generate a load indication for transmission to said mobile stations by said transmit circuits instructing said mobile stations transmitting on the reverse link channel to change their transmission rate probabilistically if the reverse link load is within a first predetermined range;
generate a load indication for transmission to said mobile stations by said transmit circuits instructing said mobile stations transmitting on the reverse link channel to change their transmission rate deterministically if the reverse link load is within a second predetermined range outside said first predetermined range.

40. The radio base station of claim 39 wherein said load indications are multi-bit values.

41. The radio base station of claim 39 wherein said control circuits are further operative to generate load indication instructing mobile stations transmitting on the reverse link to maintain their current transmission rate if the reverse link load is within a third predetermined range.

\* \* \* \* \*

UNITED STATES PATENT AND TRADEMARK OFFICE
CERTIFICATE OF CORRECTION

PATENT NO.       : 7,616,660 B2                                            Page 1 of 1
APPLICATION NO.  : 10/876979
DATED            : November 10, 2009
INVENTOR(S)      : Hosein et al.

It is certified that error appears in the above-identified patent and that said Letters Patent is hereby corrected as shown below:

On the Title Page, item (56), under "U.S. PATENT DOCUMENTS", in Column 2, Line 1, delete "Dejaco et al" and insert -- English et al. --, therefor.

On the Title Page, item (56), under "U.S. PATENT DOCUMENTS", in Column 2, Line 2, delete "Delprat et al" and insert -- Le Strat et al. --, therefor.

On Page 2, item (56), under "U.S. PATENT DOCUMENTS", in Column 1, Line 1, delete "DeJaco et al" and insert -- Ananthpadmanabhan, et al. --, therefor.

In Column 3, Line 20, delete "(BSC)" and insert -- (BSCs) --, therefor.

In Column 5, Line 60, in "Eq. 1", delete "{set b(b) = 00}" and insert -- {set b(n) = 00} --, therefor.

In Column 5, Line 67, delete "b(n)to" and insert -- b(n) to --, therefor.

In Column 8, Line 61, delete "elseIf b(n)=-2," and insert -- elseif b(n)=-2, --, therefor.

In Column 9, Line 29, delete "Y(n)" and insert -- y(n) --, therefor.

In Column 11, Line 39, Eq. 12, delete "$T_{MIN}=S_k(P_{PMIN}-P_k)/(P_{MAX}-P_{MIN})*Y'''$" and insert -- $T_{MIN}=S_k(P_{MIN}-P_k)/(P_{MAX}-P_{MIN})*Y'$ --, therefor.

In Column 12, Line 63, in Claim 8, delete "selling" and insert -- setting --, therefor.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,616,660 B2  Page 1 of 1
APPLICATION NO. : 10/876979
DATED : November 10, 2009
INVENTOR(S) : Hosein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this

Nineteenth Day of October, 2010

David J. Kappos
*Director of the United States Patent and Trademark Office*